(12) United States Patent
Frommer et al.

(10) Patent No.: US 6,904,189 B2
(45) Date of Patent: Jun. 7, 2005

(54) FAST WAVELENGTH-SELECTIVE SWITCH ELEMENTS AND SWITCH MATRICES

(75) Inventors: Aviv Frommer, Misgav (IL); Ben-Zion Kopelovitz, Kfar Saba (IL)

(73) Assignee: Lynx Photonic Networks, Inc., Calabasas Hills, CA (US)

( * ) Notice: Subject to any disclaimer, the term of this patent is extended or adjusted under 35 U.S.C. 154(b) by 447 days.

(21) Appl. No.: 10/079,522

(22) Filed: Feb. 22, 2002

(65) Prior Publication Data

US 2003/0161566 A1 Aug. 28, 2003

(51) Int. Cl.$^7$ .............................. G02B 6/00; G02B 6/26

(52) U.S. Cl. ........................... 385/11; 385/16; 385/147

(58) Field of Search .................................. 385/2, 10–24, 385/50, 37, 147; 398/122; 372/6, 13; 359/285

(56) References Cited

U.S. PATENT DOCUMENTS

| | | | | |
|---|---|---|---|---|
| 5,900,957 A | * | 5/1999 | Van Der Tol | 398/54 |
| 6,370,167 B1 | * | 4/2002 | Donati et al. | 372/20 |
| 6,754,403 B1 | * | 6/2004 | Schmid | 385/7 |
| 2003/0161566 A1 | * | 8/2003 | Frommer et al. | 385/11 |
| 2003/0235370 A1 | * | 12/2003 | Taillaert et al. | 385/50 |
| 2004/0008916 A1 | * | 1/2004 | Ridgway et al. | 385/2 |
| 2004/0208614 A1 | * | 10/2004 | Price | 398/152 |

OTHER PUBLICATIONS

H. Nakajima, "Development on guided–wave switch arrays."*IECE Trans. Commun.* vol. E–82B, pp. 349–356, 1999.
"Wavelength–selective devices" by M.K. Smit, A.M.J. Koonen, H. Herrmann and W. Sohler in N. Grote, H. Venghaus (eds.), *Devices in Optical Communication Systems,* Springer Verlag, Berlin (2000).

Alferness "Efficient waveguide electro–optic TE–TM mode converter/wavelength filter" Appl physics Lett. vol. 36 pp 513–515, 1980.
Neyer, "Low cross–talk passive polarization splitters using Ti:LiNbO$_3$ waveguide crossings", *Appl. Phys. Lett.,* vol. 55 pp. 927–929, 1989.
F. Tian, Ch. Harizi, H. Herrmann, V. Reimann, R. Ricken, U. Rust, W. Sohler, F. Wehrmann and S. Westenhofer, "Polarization independent integrated optical, acoustically tunable double stage wavelength filter in LiNbO$_3$ ", *J. Lightwave Technol.,* vol. 12 pp. 1192–1197, 1994.

(Continued)

*Primary Examiner*—Akm Enayet Ullah
(74) *Attorney, Agent, or Firm*—Mark M. Friedman

(57) ABSTRACT

Ultra fast, compact wavelength-selective 2×2 optical switches based on polarization splitters and preferably electro-optical polarization converters, and switch matrices based on such switches. The switches and switch matrices are preferably implemented on electro-optical substrates using planar light-wave circuit technology. Switch designs include switches comprised of two polarization splitters and two polarization converters, and a switch comprised of one polarization splitter and two polarization converters. In a preferred embodiment, a switch comprises a TE-barring polarization splitter, a TM-barring polarization splitter, and two electro-optical wavelength-selective polarization converters connected in parallel between the TE- and TM-barring polarization splitters, and is implemented on an electro-optical substrate such as InP, GaAs, LiNbO$_3$ or LiTaO$_3$ using planar lightwave circuit technology. A preferred embodiment of a switch matrix for connecting i optical inputs to i monitoring outputs and to j optical outputs comprises a plurality of i×j wavelength-selective 2×2 optical switches arranged in i rows and j columns, each optical switch including a TE-barring polarization splitter, a TM-barring polarization splitter, and two wavelength-selective polarization converters connected in parallel between the TE- and TM-barring polarization splitters. The switch matrix is also preferably implemented using planar lightwave circuit technology.

21 Claims, 9 Drawing Sheets

OTHER PUBLICATIONS

Wehrmann, Ch. Harizi, H. Herrmann, U. Rust, W. Sohler and S. Westenhofer, "Integrated optical, wavelength–selective, acoustically tunable 2×2 switches (add–drop multiplexers) in LiNbO$_3$ ", *IEEE J. Selected topics in Quantum Electronics,* vol. 2 pp. 263–269, 1996.

N. Goto and G.L. Yip, "A TE–TM mode splitter in LiNbO$_3$ by proton exchange and Ti diffusion", *J. Lightwave Technol.,* vol. 7 pp. 1567–1574, 1989.

J.E. Baran and D. A. Smith, "Adiabatic 2×2 Polarization splitter in LiNbO$_3$ ", *IEEE Phot. Technol. Lett.,* vol. 4 pp. 39–40, 1992.

T. Pohlmann et al "Polarization Independent Ti:LiNb03 Switches and Filters" IEEE J of Quantum Electronics, vol. 27 pp. 602–607, 1991.

* cited by examiner (A)

(B)

(C)

FAST WAVELENGTH-SELECTIVE SWITCH ELEMENTS AND SWITCH MATRICES

FIELD AND BACKGROUND OF THE INVENTION

The present invention relates to optical switch elements and optical switch matrices and, more particularly, to a method and architecture to realize wavelength-selective switch elements and wavelength-selective switch matrices ("Lambda switches") on electro-optical substrates such III–V compounds, particularly based on InP and GaAs, $LiNbO_3$, and $LiTaO_3$ using preferably Planar Lightwave Circuit (PLC) technology.

Integrated optical switches are well known. For a recent review of the art using $LiNbO_3$ substrates, see H. Nakajima, "Development on guided-wave switch arrays." *IECE Trans. Commun.* Vol. E-82B, pp. 349–356, 1999. Waveguides are created in the electro-optical substrate material by processing the substrate locally to increase the index of refraction. For example, the index of refraction of lithium niobate may be increased locally by diffusing titanium into the substrate. To divert light from one waveguide to another, the waveguides are coupled by local electro-optical manipulation of their indices of refraction. Well-known examples of electro-optical switches include directional couplers, Mach-Zender Interference switches, BOA couplers, digital optical switches and x-switches. Depending on the voltage applied to such a switch, light is thus partly or completely diverted from an input waveguide to an output waveguide.

By appropriately combining waveguides and switches, a switch matrix is formed to switch light from a plurality of input waveguides among a plurality of output waveguides. A variety of switch matrix geometries are known. FIG. 1 is a conceptual illustration of a switch matrix of one such geometry: crossbar geometry. A set of input waveguides 10 crosses a set of output waveguides 12. At the crossing points, the waveguides are coupled by 2×2 switches 14. For simplicity, only three input waveguides 10 and three output waveguides 12 are shown in FIG. 1. Typically the numbers of input waveguides 10 and output waveguides 12 are equal powers of 2, up to a practical maximum of 32.

All the electro-optical switch elements mentioned above have a broad wavelength (frequency) response (compared to the 50–400 GHZ standard spacing in typical WDM systems), i.e. are not wavelength-selective. Wavelength-selective integrated optical switch elements have also been developed for WDM communication systems using integrated acousto-optical $LiNbO_3$ devices. A summary of such devices can be found in "Wavelength-selective devices" by M. K. Smit, A. M. J. Koonen, H. Herrmann and W. Sohler in N. Grote, H. Venghaus (eds.), *Devices in Optical Communication Systems*, Springer Verlag, Berlin (2000) [hereinafter SMI00] and references therein. Switch matrices with no wavelength selectivity have very high loss in connections of "many inputs to one or many outputs", since combining multiple inputs to the same output has a high loss penalty. In practice such switch matrices enable only point-to-point or point-to-multi-point (multicasting). However, wavelength-selective switch elements can be used to construct switch matrices that can connect many-to-many points, i.e. many inputs to one or to many outputs. This is being done by using the wavelength dimension as an extra degree of freedom to route signals. One output may be simultaneously connected to multiple inputs, where each input is transmitting signals at different wavelength to that output, thus avoiding signal contention.

The basic building blocks for existing acousto-optical switch elements are polarization splitters and acousto-optical polarization converters. Polarization splitters and electro-optical polarization converters implemented in PLCs are known in the art. They are the basic building blocks for the wavelength-selective switch elements and wavelength-selective switch matrices of the present invention. Their principle of operation is given here: polarization converters in PLCs are normally implemented in $LiNbO_3$ or in III–IV semiconductors, while polarization splitters are also implemented on Silica substrates. A $LiNbO_3$ electro-optic polarization converter consists of a $LiNbO_3$ substrate with a Titanium diffused strip waveguide and finger electrodes of period A [R. C. Alferness, "Elecrooptic guided wave device for general polarization transformations", *IEEE J. Quantum Electron.*, vol. QE-17 pp. 2225–2227, 1981, and R. C. Alferness and L. L. Buhl, "New low-loss elecrooptic polarization controller for $\lambda=1.32$ $\mu m$", in *Proc. 4$^{th}$ Int.Conf. Integrated Opt. Optical Fiber Commun.* (Tokyo, Japan) 1983 pp. 38–39]. With proper crystal and electrode orientations, it utilizes an off-diagonal element of the electro-optic tensor to achieve coupling between the otherwise orthogonal TE and TM modes. Electro-optic polarization conversion is characterized analytically by the well-known co-directional coupled wave equations. The conversion efficiency is given by:

$$\eta_{TE \leftrightarrow TM} = \frac{\sin^2\{kL[1+(\delta/k)^2]^{1/2}\}}{1+(\delta/k)^2} \quad (1)$$

Where $\delta=\Delta\beta/2$, $\Delta\beta$ is the effective phase mismatch defined in Eq. (3), L is the interaction length and k is the coupling coefficient. Since $LiNbO_3$ is strongly birefringent, polarization phase matching between the TE and TM modes is necessary. Efficient coupling between the non-synchronous TE and TM modes is achieved by using an electrode period A that satisfies the phase matching condition:

$$(2\pi/\lambda_0)|N_{TE}-N_{TM}|=2\pi/\Lambda \quad (2)$$

where $N_{TE}$, and $N_{TM}$ are the effective waveguide indices for the TE and TM mode respectively. This phase matching requirement results in a strong wavelength dependence of the polarization conversion, because for fixed A Eq.2 is satisfied exactly only for $\lambda_0$. The effective phase mismatch for any other wavelength $\lambda=\lambda_0+\Delta\lambda$ is:

$$\Delta\beta=-(2\pi/\Lambda)\Delta\lambda/\lambda \quad (3)$$

The normalized filter bandwidth (FWHM) can be found from Eqs. 1, 2 and 3 (with $kL=\pi/2$):

$$\Delta\lambda_{BW}/\lambda_0 \sim \Lambda/L=1/N \quad (4)$$

where N is the number of electrode fingers. Typical devices have bandwidths of ~1–5 nm.

FIG. 2A shows schematically a wavelength-selective polarization converter. It leaves the state of polarization of the incoming wave as is when it is in its "OFF" state. In the "ON" state it converts an input TE (TM) wave at wavelength $\lambda_1$ to a TM (TE) wave on the output. Other wavelengths are not affected.

A polarization splitter separates the TE and TM components of an incoming wave, and is shown schematically in FIG. 2B. Depending on the waveguide design of the splitter, it can either "bar" the TM polarization component and "cross" the TE component, or "bar" the TE polarization component and "cross" the TM component. Two concepts have been used to realize polarization splitters on LiNbO$_3$. Both concepts yield polarization splitters with splitting ratios exceeding 20 dB.

The first concept, shown in FIG. 2C, uses a passive directional coupler structure fabricated by applying solely the Ti-indiffussion technique [see e.g. A. Neyer, "Low cross-talk passive polarization splitters using Ti:LiNbO$_3$ waveguide crossings", *Appl. Phys. Lett.*, vol. 55 pp. 927–929, 1989; F. Tian, Ch. Harizi, H. Herrmann, V. Reimann, R. Ricken, U. Rust, W. Sohler, F. Wehrmann and S. Westenhofer, "Polarization independent integrated optical, acoustically tunable double stage wavelength filter in LiNbO$_3$", *J. Lightwave Technol.*, vol. 12 pp. 1192–1197, 1994; and F. Wehrmann, Ch. Harizi, H. Herrmann, U. Rust, W. Sohler and S. Westenhofer, "Integrated optical, wavelength-selective, acoustically tunable 2×2 switches (add-drop multiplexers) in LiNbO$_3$", *IEEE J. Selected topics in Quantum Electronics*, vol. 2 pp. 263–269, 1996]. The coupler is designed to route TE-polarized waves to the cross-state output, and TM-polarized waves to the bar state output or vice versa, by taking advantage of the polarization dependent refractive index profiles.

The second concept is based on a hybrid Ti-indiffussion/proton exchange technology [N. Goto and G. L. Yip, "A TE-TM mode splitter in LiNbO$_3$ by proton exchange and Ti diffusion", *J. Lightwave Technol.*, vol. 7 pp. 1567–1574, 1989.]. In the proton exchanged regions the extraordinary refractive index is increased whereas the ordinary is reduced. A 1×2 polarization splitter (Y junction) can be fabricated using Ti-diffused waveguide to carry the TM (in X-cut LiNbO$_3$) polarized waves and a proton exchange branching section to extract the TE polarized waves. This splitter operates by adiabatic evolution of the fundamental mode into that output waveguide which has the highest effective index for a given polarization. 2×2 polarization splitters are produced by incorporating four such adiabatic Y junctions [J. E. Baran and D. A. Smith, "Adiabatic 2×2 Polarization splitter in LiNbO$_3$", *IEEE Phot. Technol. Lett.*, vol. 4 pp. 39–40, 1992].

Existing acousto-optical switch elements based on polarization splitters and acousto-optical polarization converters have a typical response time of several microseconds, which constitutes a major disadvantage in various uses. They also have a typical size of a few tens of millimeters, which limits integration of such devices to a practical maximum of a few devices at most on a single substrate. Acousto-optic polarization converters and switches are also accompanied by an imposed optical frequency shift equal in magnitude to the acoustic frequency, with a sign determined by whether a phonon was absorbed or emitted during the polarization flip.

In view of the above-listed disadvantages of existing acousto-optical wavelength-selective switches, there is a widely recognized need for, and it would be highly advantageous to have, ultra-fast, compact wavelength-selective switches, with no associated optical frequency shift, and switch matrices based on such switches.

SUMMARY OF THE INVENTION

The present invention discloses ultra fast and compact wavelength-selective switches. In various preferred embodiments, these switches are based on polarization splitters and on preferably electro-optical polarization converters, which have no associated optical frequency shift. The present invention also discloses switch architectures based on novel combinations of polarization splitters and polarization converters, and switch matrices based on various preferred embodiment switches. These architectures are preferably implemented with electro-optical polarization converters. However, non-electro-optical polarization converters, for example based on acousto-optical elements or discrete, bulk, non acousto-optical elements, are also envisioned as falling within the scope of the present invention.

According to the present invention, there is provided a wavelength-selective 2×2 optical switch used to switch a plurality N of optical channels having N different wavelengths from each of two input ports to each of two output ports, the switch having an ON and an OFF state and comprising two identical polarization splitters and two wavelength-selective polarization converters connected in parallel between the polarization splitters, whereby the optical switch crosses at least one channel and bars N minus at least one channels in the ON state, and bars all N channels in the OFF state. In a preferred embodiment, the two wavelength-selective polarization converters are electro-optical polarization converters. Most preferably, the two polarization splitters and the two electro-optical polarization converters are implemented on an electro-optical substrate using planar light-wave circuit technology, the substrate selected from the group consisting of III-V compound semiconductors, LiNbO$_3$, and LiTaO$_3$.

According to the present invention there is provided a wavelength-selective 2×2 optical switch used to switch a plurality N of optical channels having N different wavelengths from each of two input ports to each of two output ports, the switch having an ON and an OFF state and comprising a TE-barring polarization splitter, a TM-barring polarization splitter, and two wavelength-selective polarization converters connected in parallel between the TE and TM polarization splitters, whereby the optical switch bars at least one channel and crosses N minus at least one input channels in the ON state, and crosses all N channels in the OFF state. In a preferred embodiment, the two wavelength-selective polarization converters are electro-optical polarization converters. Optionally, the two wavelength-selective polarization converters are selected from the group consisting of acousto-optic and discrete bulk optical elements. Most preferably, the TE and TM barring polarization splitters and the two polarization converters are implemented on an electro-optical substrate using planar light-wave circuit technology, the substrate selected from the group consisting of III-V compound semiconductors, LiNbO$_3$, and LiTaO$_3$.

According to the present invention there is provided a low-loss, asymmetric response wavelength-selective 2×2 optical switch used to switch a plurality N of optical channels having N different wavelengths from each of a first and a second input port to a first and a second output port, the switch having an ON and an OFF state and comprising a polarization splitter having a first and a second input branch and a first and second output branch, a first wavelength-selective polarization converter connected between one input branch of the polarization splitter and its respective input port, and a second wavelength-selective polarization converter functionally identical with the first polarization converter and same-side connected between the output branch of the polarization splitter and the respective output port, whereby when using polarized light at the input ports and in the OFF state, the optical switch crosses all N channels, and whereby when in the ON state the optical switch crosses all N channels of the first input port while flipping the polarization of at least one of the input channels of the first input port, and bars at least one input channel of the second input port while crossing N minus at least one channels of the second input port.

According to one preferred embodiment of a first switch matrix disclosed by the present invention, there is provided a wavelength-selective optical switch matrix for connecting i optical inputs to i monitoring outputs and to j optical outputs, comprising a plurality of i×j wavelength-selective 2×2 optical switches arranged in i rows and j columns as shown in FIG. 6, each optical switch including a TE-barring polarization splitter, a TM-barring polarization splitter, and two wavelength-selective polarization converters connected in parallel between the TE and TM polarization splitters as shown in FIG. 4.

According to another preferred embodiment of the first switch matrix disclosed in the present invention, the first switch matrix further comprises a set of i normally ON wavelength-selective set switches, each switch connected to a respective switch in the first of the j columns as shown in FIG. 7 and including a set TE-barring polarization splitter, a set TM-barring polarization splitter, and two set wavelength-selective polarization converters connected in parallel between the set TE and TM polarization splitters as shown in FIG. 4, whereby the set of normally ON switches is connected to a single optical input having many channels, and whereby the addition of the set of normally ON switches imparts a wavelength de-multiplexing functionality to the optical switch matrix.

According to yet another preferred embodiment of the first switch matrix disclosed in the present invention, the first switch matrix further comprises an additional column of normally ON wavelength-selective column switches, each column switch connected to a respective switch in the last of the j columns as shown in FIG. 8, each column switch including a column TE-barring polarization splitter, a column TM-barring polarization splitter, and two column wavelength-selective polarization converters connected in parallel between the column TE and TM polarization splitters as shown in FIG. 4, whereby the additional column of normally ON switches combines the i monitoring outputs into a single combined monitoring output, and whereby the combined monitoring output can be directed toward an optical performance monitoring system.

In yet another embodiment of the first switch matrix of the present invention, the first switch matrix further comprises both a set of i normally ON wavelength-selective set switches, each said set switch connected to a respective switch in the first of the j columns, and an additional column of normally ON wavelength-selective column switches, each column switch connected to a respective switch in the last of the j columns as shown in FIG. 9, each said set and column switch including a TE-barring polarization splitter, a TM-barring polarization splitter, and two wavelength-selective polarization converters connected in parallel between the TE and TM polarization splitters as shown in FIG. 4.

According to one preferred embodiment of a second switch matrix disclosed by the present invention there is provided a wavelength-selective optical switch matrix for connecting i optical inputs to i monitoring outputs and to j optical outputs, comprising a plurality of i×j wavelength-selective 2×2 optical switches arranged in i rows and j columns as shown in FIG. 6, each optical switch including a polarization splitter having a first and a second input branch and a first and second output branch, a first wavelength-selective polarization converter connected between one input branch of the polarization splitter and its respective input port, and a second wavelength-selective polarization converter functionally identical with the first polarization converter and same-side connected between the output branch of the polarization splitter and the respective output port as shown in FIG. 5.

According to another preferred embodiment of the second switch matrix disclosed by the present invention, the second switch matrix further comprises, in a second preferred embodiment, a set of i normally ON wavelength-selective set switches, each set switch connected to a respective switch in the first of the j columns as shown in FIG. 7 and including a set polarization splitter having a first and a second input branch and a first and second output branch, a first wavelength-selective set polarization converter connected between one input branch of the polarization splitter and its respective input port, and a second wavelength-selective set polarization converter functionally identical with the first set polarization converter and same-side connected between the output branch of the set polarization splitter and the respective output port as shown in FIG. 5, whereby the set of normally ON set switches is connected to a single optical input having many channels, and whereby the addition of the set of normally ON set switches imparts a wavelength de-multiplexing functionality to the optical switch matrix.

According to yet another preferred embodiment of the second switch matrix of the present invention, the second switch matrix further comprises an additional column of normally ON wavelength-selective column switches, each column switch connected to a respective switch in the last of the j columns as shown in FIG. 8, each column switch including a column polarization splitter having a first and a second input branch and a first and a second output branch, a first wavelength-selective column polarization converter connected between one input branch of the column polarization splitter and its respective input port, and a second wavelength-selective column polarization converter functionally identical with the first column polarization converter and same-side connected between the output branch of the polarization splitter and the respective output port as shown in FIG. 5, whereby the additional column of normally ON column switches combines the i monitoring outputs into a single combined monitoring output, and whereby the combined monitoring output can be directed toward an optical performance monitoring system.

In yet another preferred embodiment of the second switch matrix of the present invention, the second switch matrix further comprises both a set of i normally ON wavelength-selective set switches, each set switch connected to a respective switch in the first of the j columns, and an additional column of normally ON wavelength-selective column switches, each column switch connected to a respective switch in the last of the j columns as shown in FIG. 9, each set and column switch including a polarization splitter having a first and a second input branch and a first and a second output branch, a first wavelength-selective polarization converter connected between one input branch of the polarization splitter and its respective input port, and a second wavelength-selective polarization converter functionally identical with the first polarization converter and same-side connected between the output branch of the polarization splitter and the respective output port as shown in FIG. 5.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
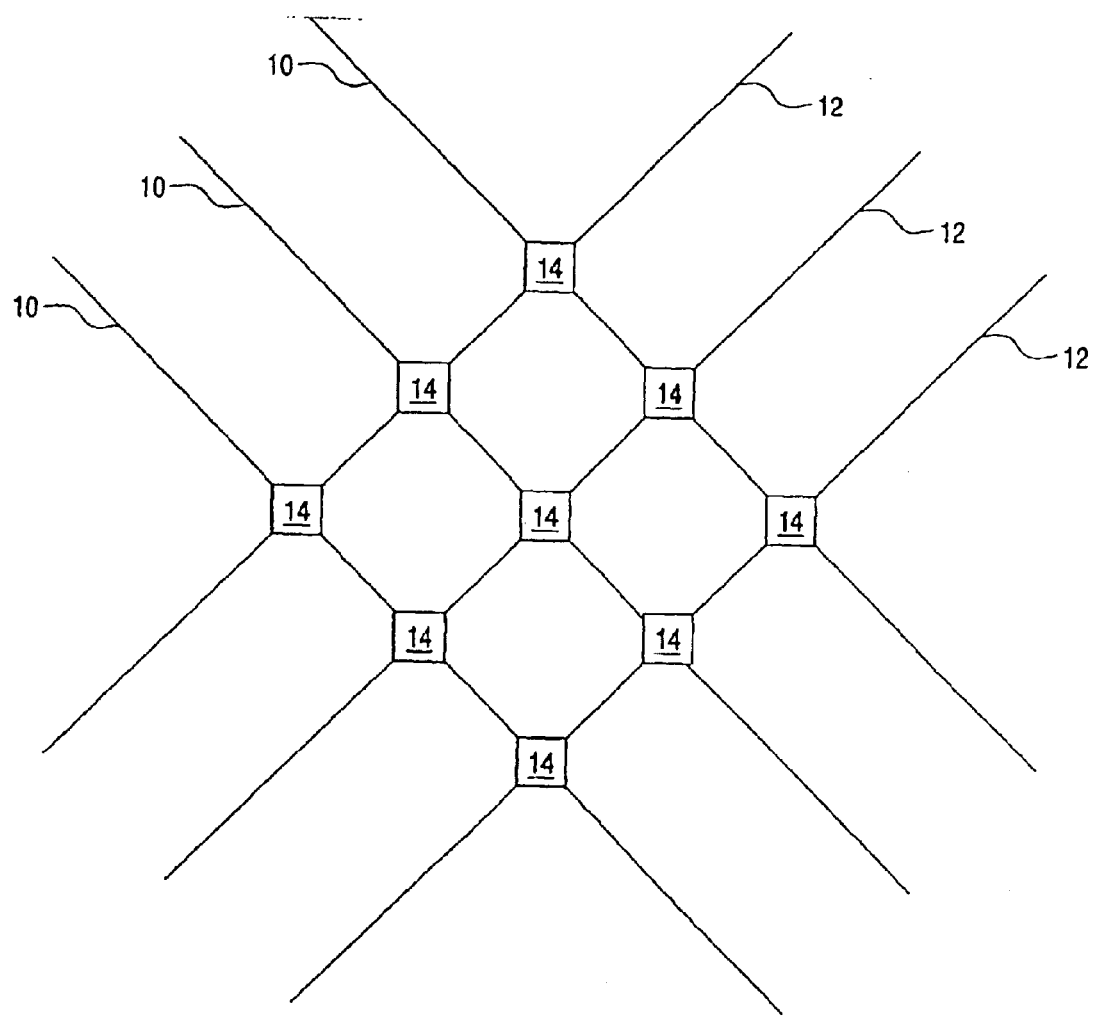
FIG. 1 shows a conceptual description of a crossbar switch matrix geometry.
Figure 2:
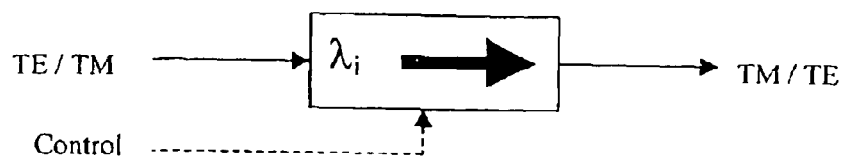
FIG. 2 shows schematically a wavelength-selective polarization converter in (A), a polarization splitter in (B), and one type of implementation of the splitter in (C)
Figure 2:
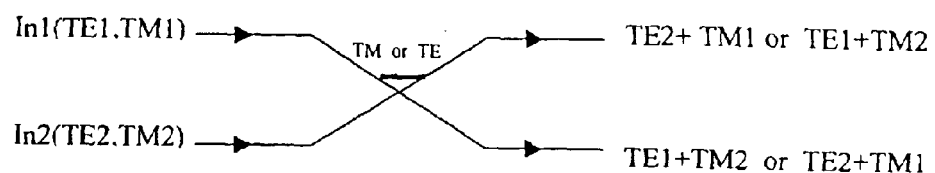
Figure 2:
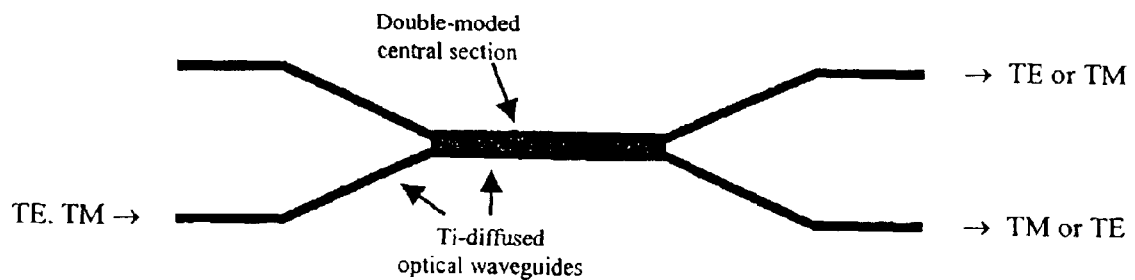

The present invention presents ultra fast strongly wavelength-selective switch elements. The switch elements are based on a combination of strongly wavelength-selective polarization converters, such as the one shown schematically in FIG. 2A, and polarization splitters such as the one shown schematically in FIG. 2B. Both are preferably implemented as PLC elements on an electro-optical substrate material such as LiNbO$_3$. The present invention presents a design for wavelength-selective switching based on basic elements (polarization splitters and polarization converters) that is novel, since it is apparently the first known design to incorporate polarization splitters with electro-optical based polarization converters to achieve fast and compact wavelength-selective switching.

Using these two basic building blocks, various wavelength-selective switches can be built. The most preferred switch designs incorporate electro-optical polarization converters with typical lengths of a few mm, and polarization splitters with typical lengths of several hundreds of $\mu$m, and are implemented in planar light-wave circuit technology. The total length of these switches is thus on the order of a few mm, similar to that of the directional coupler and digital switches that have been previously used to realize LiNbO$_3$—based switching matrices. In all the designs, the switch is OFF when the converters are OFF, and the switch is ON when the converters are ON.

Figure 3:
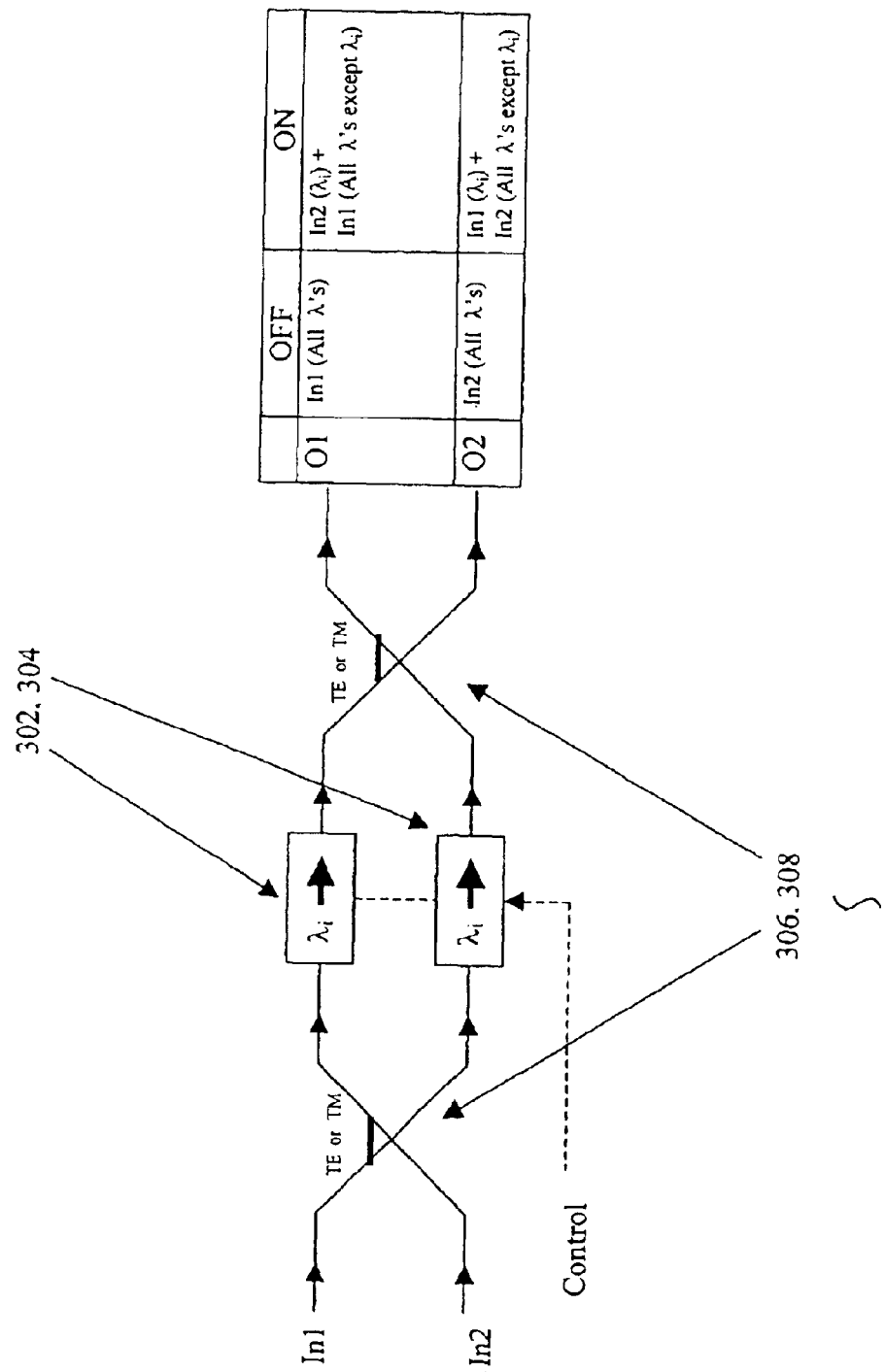
FIG. 3 shows schematically an embodiment of a polarization independent 2×2 wavelength-selective switch that uses two polarization converters and two identical polarization splitters.

FIG. 3 shows schematically an embodiment of a polarization independent 2×2 wavelength-selective switch 300 according to the present invention. Switch 300 allows individual routing of the wavelength channels of a WDM transmission line to either the cross or bar outputs of the device. The switch consists of two preferably electro-optical polarization converters 302 and 304 and two (first and second, respectively) identical polarization splitters 306 and 308. A light signal having N channels, each channel of a different wavelength $\lambda_1, \ldots \lambda_N$, and of arbitrary polarization, enters for example at an input port In1 and is divided into its TE and TM polarization components by first splitter 306. Second splitter 308 acts as a combiner. The light is routed to an output port O1 ("bar state") if no polarization conversion is performed. For converted waves, the state of polarization changes and the signal is routed to an output port O2 ("cross state"). An identical operation is performed with input In2. The light is routed to an output port O2 ("bar state") if no polarization conversion is performed. For converted waves, the state of polarization changes and the signal is routed to an output port O1 ("cross state"). For both inputs, all channels are barred in the OFF state. In the ON state all channels from a respective input are barred except for one or more channel(s) $\lambda_i$ which is crossed (see output table in FIG. 3). Hereafter, $\lambda_i$ represents either one channel or several consecutive (successive) channels.

Similar devices based on acousto-optical polarization converters used as the polarization conversion element are known in the art [see for example SMI00, and references therein]. Unlike such prior art devices that use long (few tens of mm) acousto-optical polarization converters, the present invention suggests to most preferably implement the switch elements (FIGS. 3–5) and switch matrices based on these elements (FIGS. 6–9) using compact (a few mm) electro-optical based polarization converters. A major advantage of using electro-optical polarization converters is the attendant ultra-fast switching (pico-seconds), limited only by the driving electronics in contrast with the slow switching (several microseconds) in elements based on the acousto-optical polarization converters. Another major advantage is the fact that no optical frequency shift is associated with the switching. However, some switch architectures disclosed herein, in particular those of FIGS. 4 and 5, as well as those of switch matrices based on these switches (FIGS. 6–9) can also be implemented with non electro-optical polarization converters, and still offer significant advantages over prior art switches.

Figure 4:
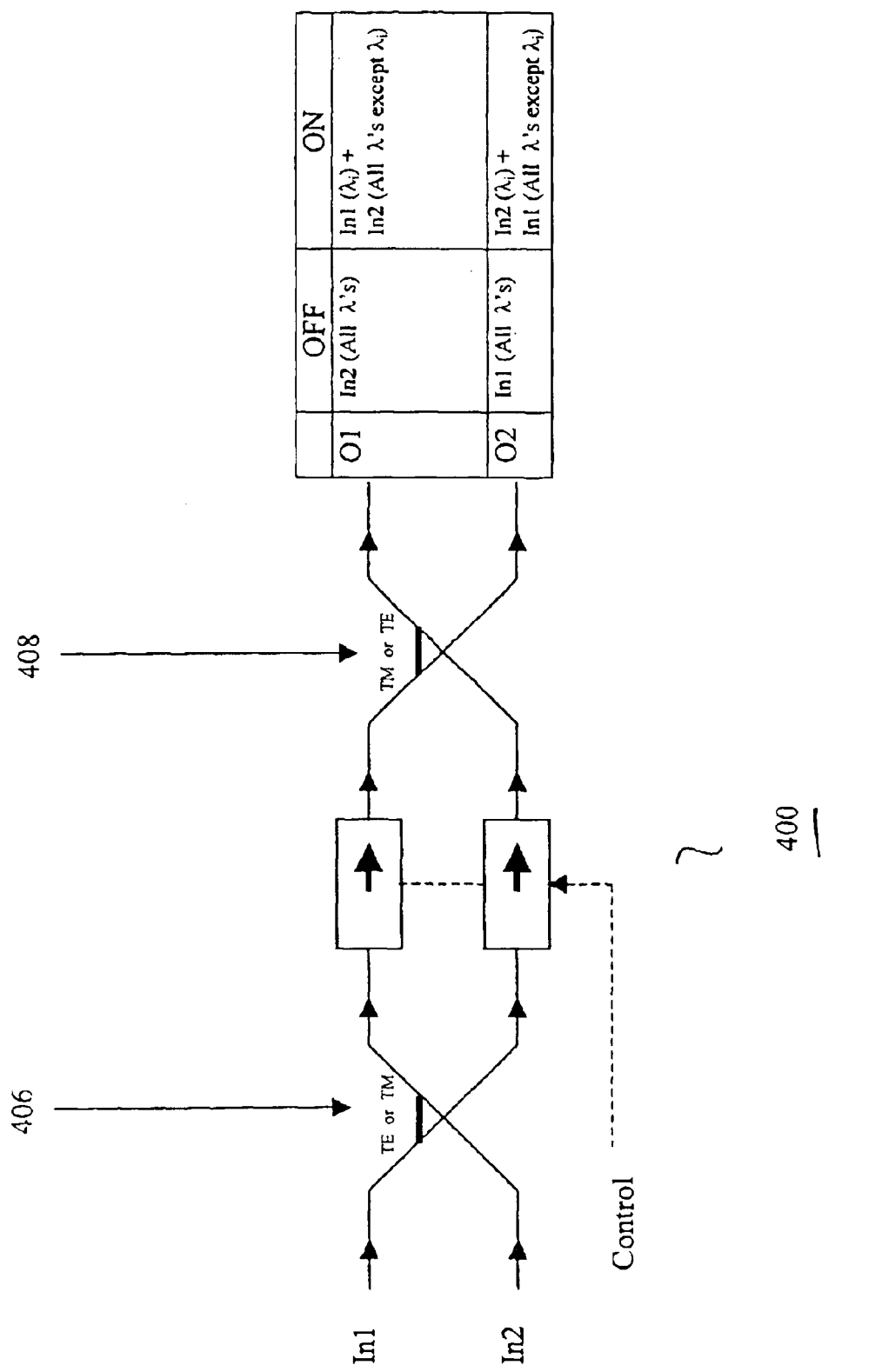
FIG. 4 shows schematically an embodiment of a switch as in FIG. 3, but having two different types of polarization splitters.

FIG. 4 shows another switch 400 design according to the present invention. Switch 400 includes two different types of polarization splitters 406 and 408. This design is similar to that of FIG. 3 but in addition, one of the splitters is of a type that bars the TE polarization component, while the second is of a type that bars the TM polarization component. For example, in one preferred embodiment, polarization splitter 406 is designed such that it "bars" the TE component and crosses the TM polarization component, whereas polarization splitter 408 is designed such that it "bars" the TM component and crosses the TE polarization component. Alternatively, in another preferred embodiment, polarization splitter 406 is designed such that it "bars" the TM component, whereas polarization splitter 408 is designed such that it "bars" the TE component. Switch 400 crosses all channels of the two inputs In1 and In2 in the OFF state, while in the ON state, switch 400 crosses all channels of the inputs except for a "filtered" channel(s) $\lambda_i$, which is barred. Here also $\lambda_i$ represents either one channel or several consecutive (successive) channels. In other words, using the combination of two different types of polarization splitters results in a device that is crossing the inputs (except for $\lambda_i$ in the ON state) instead of barring them like the device of FIG. 3. This appears to be the first known design that crosses all input channels at the outputs, apart from one or more filtered channel(s) $\lambda_i$ that is barred. This result is facilitated by the use of two different types of polarization splitters, one that bars the TE and crosses the TM polarization component, and the other that bars the TM and crosses the TE polarization component. This type of switch design has great advantage in realization of switch matrices of the types suggested in FIGS. 6–9 herein below. The fact that it crosses the unfiltered channels enables a realization of the architectures of FIGS. 6–9 with no intersecting waveguides in the layout of the switch matrix, and thus no loss and cross-talk penalties due to waveguide intersections.

Figure 5:
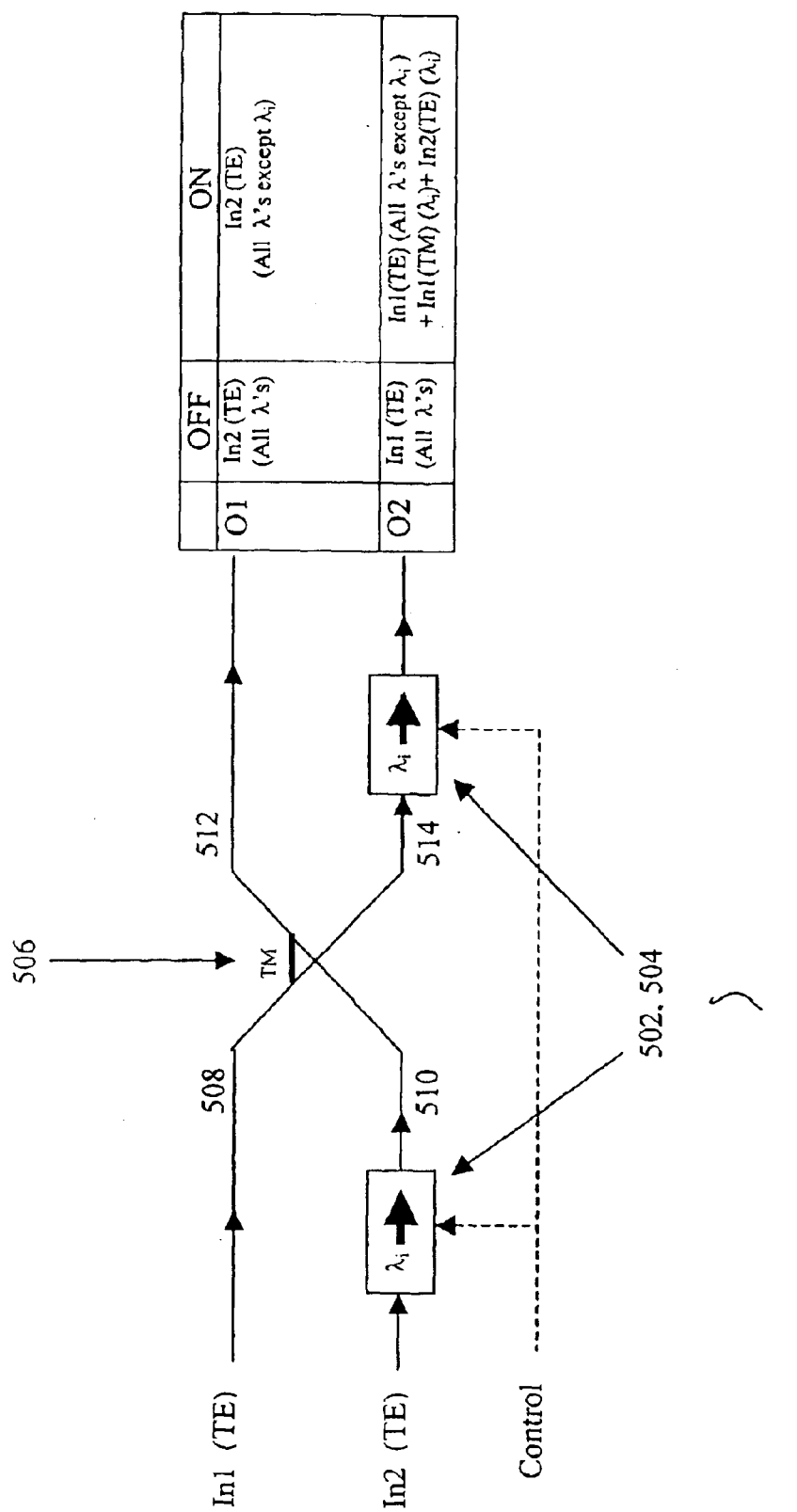
FIG. 5 shows schematically an embodiment of a switch with a similar functionality as the switch of FIG. 4, but having only one polarization splitter.

FIG. 5 shows schematically another device design, also preferably using polarization splitters and electro-optical polarization converters. Alternatively, non-electro-optical polarization converters may also be used advantageously. This is a unique 2×2 switch 500 in which only one polarization splitter is used in the optical path. Switch 500 consists of two electro-optical polarization converters 502 and 504 and a polarization splitter 506 that "bars" the TM polarization component with two input branches 508 and 510 and two output branches 512 and 514. Branches 508 and 512 form one side of splitter 506, while branches 510 and 514 form a second side of splitter 506. Converters 502 and 504 are connected to the same side of splitter 506. For example, as shown in FIG. 5, converter 502 is connected between input In2 and input branch 510, and converter 504 is connected between output branch 514 and output O2. Alternatively, both converters can be connected between the other two input and output branches 508 and 512, and the respective inputs and outputs In1 and O1. This arrangement is referred to herein as "same-sided connection" of the two polarizers with the splitter.

When using TE polarized light at the inputs In1 and In2, in the OFF state, the polarization converters are not activated, In1 is crossed to O2 and In2 is crossed to O1. In the ON state both polarization converters are activated. Here also $\lambda_i$ represents either one channel or several consecutive channels. Channel(s) $\lambda_i$ of the TE polarized light entering In2 is converted to TM polarization and the converted wave is routed to output port O2 ("bar state"). That light is then converted back to TE polarization. All other unconverted channels of In2 are routed to output port O1 ("cross state"). Light entering In1 is not converted and is all routed to output port O2 ("cross state"), channel(s) $\lambda_1$ however is converted to TM polarization by the second polarization converter 504. This however does not cause any difficulty in implementations of switch matrices such as those suggested in FIGS. 6, 7, 8 and 9 below, since no light in channel(s) $\lambda_i$ is entering In1 (if switch 500 is used such that both inputs include channel(s) $\lambda_i$ in the ON state these channels will come out with different polarizations at output port O2). Alternatively the device can be designed to work with TM light at the inputs when using a polarization splitter which "bars" the TE polarization component. Since the polarization converters are expected to have lower optical loss than the polarization splitters, using only one polarization splitter in this design will result in a lower optical loss relative to the switch 300 and 400 designs. Like the switch 400 design, switch 500 also crosses all unfiltered channels (all channels except for channel(s) $\lambda_i$), and thus also has the great advantage in realization of the switch matrices of the types suggested in FIGS. 6, 7, 8 and 9, in the sense that they may be realized with no intersecting waveguides.

The capability of optical switch matrices to create links of many-to-many having not only point-to-point or point-to-multi-point (multicasting), but also multi-point to point (combining) or multi-point to multi-point (combination of multicasting and combining) capability is a distinct advantage in any optical communication system. Such switch matrices can be advantageously built using the wavelength-selective switch elements of the present invention such as the 2×2 switch elements shown in FIG. 4 or in FIG. 5.

Figure 6:
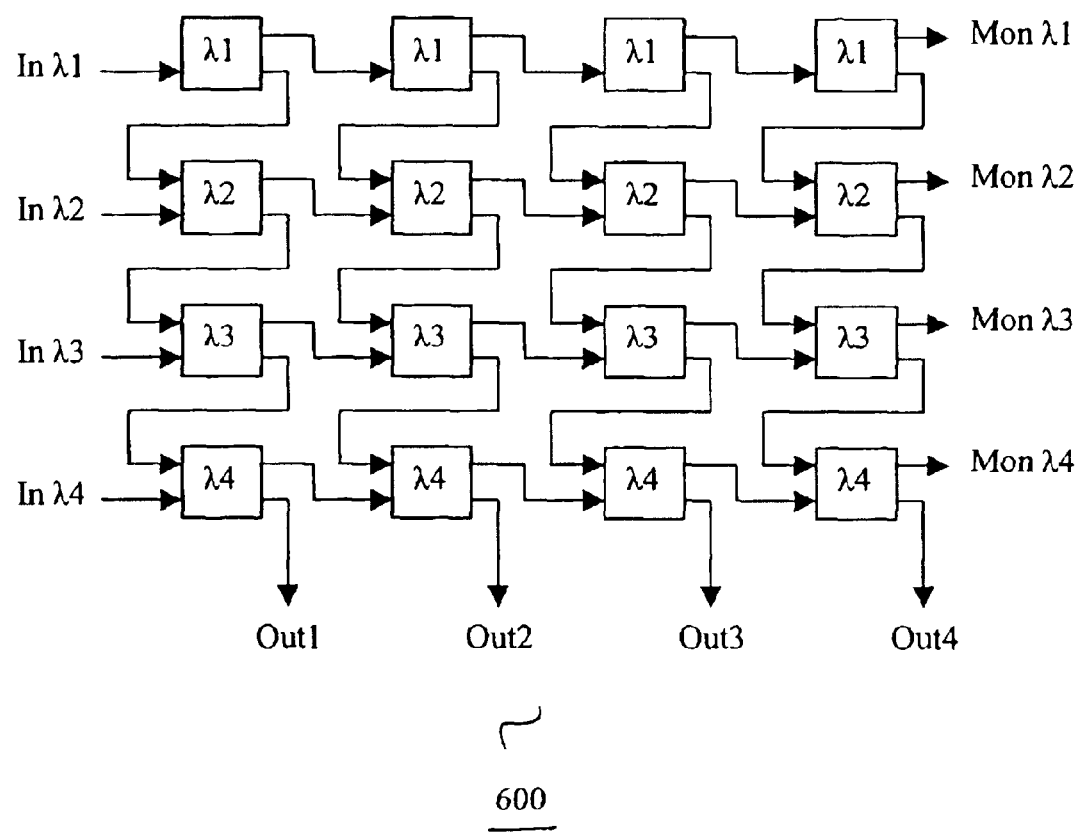
FIG. 6 shows schematically an embodiment of a switch matrix based on the switch elements of the present invention.

FIG. 6 shows a N×M switch matrix 600, (in the particular example a 4×4 switch matrix). With no ON control, switch matrix 600 will transfer each, already filtered, input In$\lambda_i$ (i=1 to 4) to its monitor "Mon$\lambda_i$" (i=1 to 4) output. Here again $\lambda_i$ either one wavelength or several consecutive wavelengths. When the user wants to switch one or more wavelength(s) $\lambda_i$ to a certain output Out$_j$ he needs to set the control for a switch at the cross-point i-j of that input line In$\lambda_i$ (row i) and the desired output column Out$_j$ (column j). The relevant switch will bar $\lambda_i$ to column j. When this $\lambda_i$ reaches the next element on column j, it will be crossed through the switch denoted $\lambda_{i+1}$, since this switch has a filtering action only on channel(s) $\lambda_{i+1}$ but not on channel(s) $\lambda_i$, and continue on column j towards output Out$_j$. Multicast is supported by barring only part of the power of the switched $\lambda_i$ at each cross point i-j i.e. the switch at the cross point of row i and column j is in a partly ON state to bar (drop) only part of the power of channel(s) $\lambda_i$ to the relevant output column Out$_j$ and cross the rest of it towards the next switching point on the line. Combining is supported by switching a few $\lambda$'s at the same column so they all go to the same output. The $\lambda_i$'s that arrives at a switch from a previous column location are totally crossed towards the next position.

Figure 7:
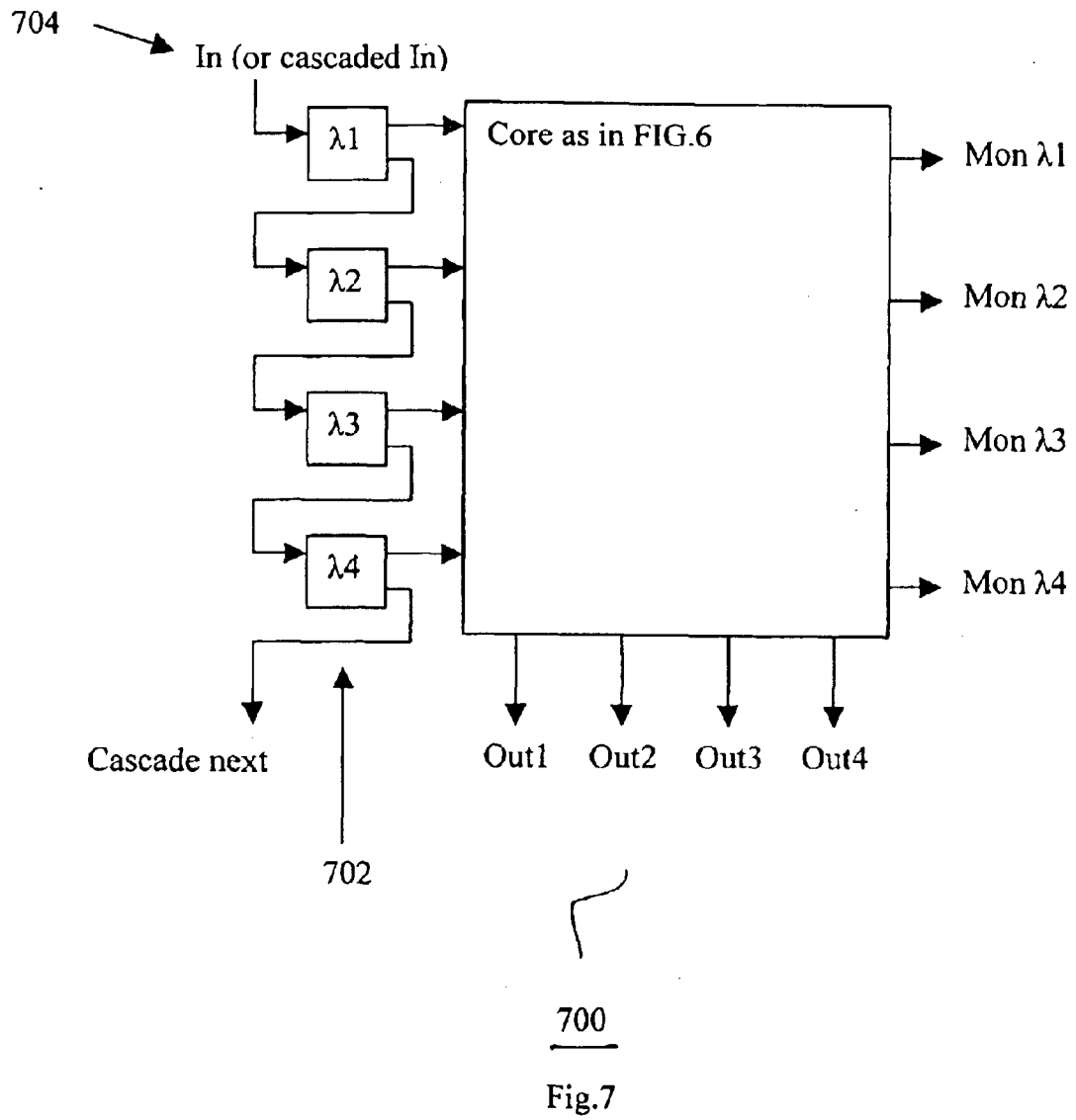
FIG. 7 shows schematically an embodiment of an integrated wavelength demultiplexer and a switch matrix based on the switch elements of the present invention.

The architecture of FIG. 6 can be enhanced by integrating it with a wavelength demultiplexing (DEMUX) functionality. A set of i "set" switches 702 that are "normally ON" (saving the need for control) can be integrated into a switch matrix 700 as shown in FIG. 7. Switches 702 are placed on the first column of switch matrix 700, i.e. are connected each to a respective switch of column j=1 of switch matrix 600. Switch matrix 700 has only one input 704 with multiple channels. Switches 702 drop channel $\lambda_i$ to row i. The rest of FIG. 7 is just the core of FIG. 6. This architecture saves the need of using a DEMUX in front of the switching matrix for demultiplexing the different wavelength channels. Switch matrix 700 thus has the functionality of a DEMUX and a switch matrix in one block.

Figure 8:
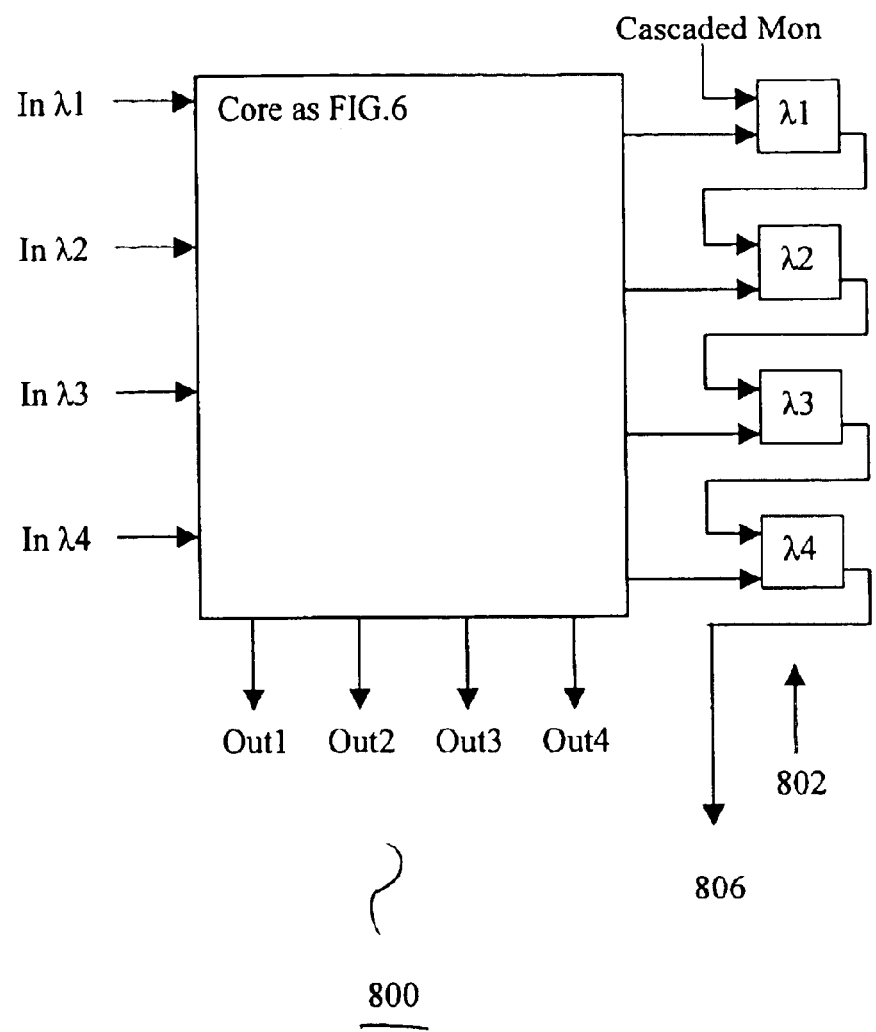
FIG. 8 shows schematically an embodiment of an integrated switch matrix and a wavelength multiplexer based on the switch elements of the present invention.

The architecture of FIG. 6 can also be enhanced by integrating an additional column of normally ON "column" switches to combine (multiplex) all of the monitoring output wavelengths to a single monitoring output. This output could then be directed towards an Optical Spectrum Analyzer (OSA) for Optical Performance Monitoring (OPM). FIG. 8 shows a switch matrix 800 with an additional column of "normally ON" switches 802 attached to the last column of the switch matrix of FIG. 6, i.e. each switch of switches 802 is connected to a respective switch of column j=4 of switch matrix 600. Column 802 combines all Mon$_i$ output wavelengths to a single monitoring output 806. This allows to integrate such a switch matrix into a standard optical WDM communication system in which OPM is done simultaneously on all wavelength channels using a single input OSA device. This can be done by using output 806 of the switch matrix as the input to the OPM.

Figure 9:
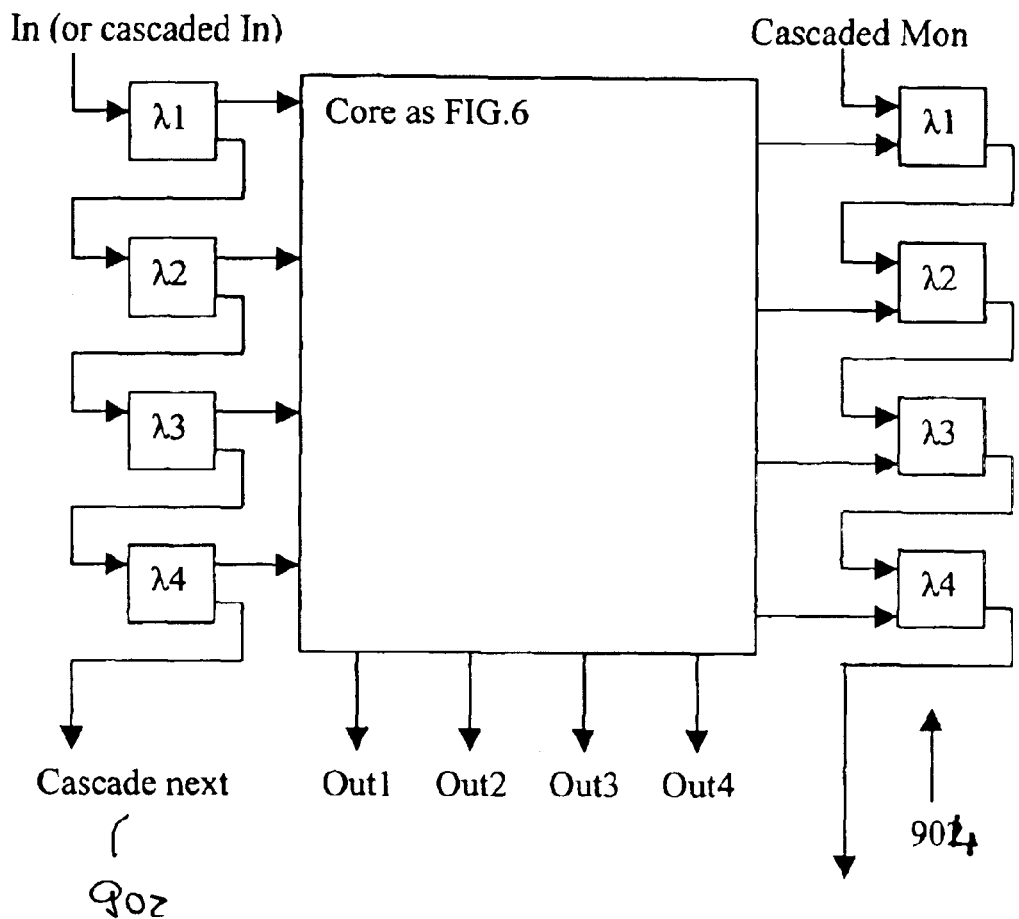
FIG. 9 shows schematically an embodiment of an integrated wavelength demultiplexer, a switch matrix and a wavelength multiplexer based on the switch elements of the present invention.

Finally, the architectures of FIGS. 7 and 8 can be combined as shown in FIG. 9, by integrating both a set of normally ON set switches 902 and an additional column of normally ON column switches 904 with the basic switch matrix of FIG. 6. This architecture combines the switch matrix, wavelength demultiplexing, and multiplexing of all the monitoring output wavelengths to a single monitoring output functionalities in a single block.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. An ultra fast wavelength-selective 2×2 optical switch having an ON and an OFF state and used to switch a plurality of N optical channels, each channel having a different wavelength, from each of two input ports to each of two output ports, comprising:
   a. a TE-barring polarization splitter,
   b. a TM-barring polarization splitter, and
   c. two wavelength-selective polarization converters connected in parallel between said TE- and TM-barring polarization splitters, whereby said optical switch is operative to bar X filtered channels and to cross N−X unfiltered channels in the ON state, and to cross all the N channels in the OFF state, wherein said X may range between I and N.

2. The wavelength-selective switch of claim 1, wherein said two wavelength-selective polarization converters are electro-optical polarization converters.

3. The wavelength-selective switch of claim 1, wherein said two wavelength-selective polarization converters are selected from the group consisting of acousto-optic polarization converters and discrete bulk optical polarization converters.

4. The wavelength-selective switch of claim 2, implemented on an electro-optical substrate using planar lightwave circuit technology.

5. The wavelength-selective switch of claim 4, wherein said electro-optical substrate is selected from the group consisting of III–V compound semiconductors, $LiNbO_3$ and $LiTaO_3$.

6. A wavelength-selective N×M optical switch matrix for connecting i optical inputs to i monitoring outputs and to j optical outputs, comprising
   a. a plurality of i×j wavelength-selective 2×2 optical switches arranged in i rows and j columns, each said switch identifiable by a respective i-j marking, each said switch having two input and two output ports and configured to receive and provide light of different wavelengths, wherein each said switch includes
      i. a TE-barring polarization splitter,
      ii. a TM-barring polarization splitter, and
      iii. two wavelength-selective polarization converters connected in parallel between said TE-and TM-barring polarization splitters, and
   b. a mechanism for activating each said i-j switch thereby obtaining an activated state that facilitates a switch matrix function selected from the group consisting of simple input i to output j wavelength selective switching, multicasting and combining.

7. The wavelength-selective optical switch matrix of claim 6, wherein said two wavelength-selective polarization converters include electro-optical polarization converters.

8. The wavelength-selective optical switch matrix of claim 6, wherein said two wavelength-selective polarization converters are selected from the group consisting of acousto-optic and discrete bulk optical elements.

9. The wavelength-selective optical switch matrix of claim 7, wherein each said i input has N different wavelengths, and wherein said control mechanism that facilitates said simple input i to output j wavelength selective switching is operative at said i-j switch to bar X wavelengths to said output j, wherein X may range between I and N.

10. The wavelength-selective optical switch matrix of claim 7, wherein each said i input has N different wavelengths, and wherein said mechanism that facilitates said multicasting is operative at said i-j switch to partially bar X wavelengths to a relevant output column j, and to cross N−X wavelengths to a next switching point in the matrix, wherein X may range between I and N.

11. The wavelength-selective optical switch matrix of claim 7, wherein each said input has N different wavelengths, and wherein said mechanism that facilitates said combining includes a plurality of individual control mechanism operating on respective switches in a single said column to bar at least one wavelength from each said single column switch to a common output j.

12. The wavelength-selective optical switch matrix of claim 7, further comprising an additional column of i normally ON wavelength-selective set switches, each said set switch connected to a respective switch in the first of said j columns, whereby said set of normally ON switches is connected to a single optical input having many channels, and whereby the addition of said set of normally ON switches imparts a wavelength de-multiplexing functionality to said optical switch matrix.

13. The wavelength-selective optical switch matrix of claim 7, further comprising and additional column of i normally ON wavelength-selective column switches, each said column switch connected to a respective switch in the last of said j columns, whereby said additional column of normally ON switches combines the i monitoring outputs into a single combined monitoring output, and whereby said combined monitoring output can be directed toward an optical performance monitoring system.

14. The wavelength-selective optical switch matrix of claim 12, further comprising an additional column of i normally ON wavelength-selective set switches, each said set switch connected to a respective switch in the first of said j columns, whereby said set of normally ON switches is connected to a single optical input having many channels, and whereby the addition of said set of normally ON switches imparts a wavelength de-multiplexing functionality to said optical switch matrix.

15. The wavelength-selective optical switch matrix of claim 7, wherein said polarization splitter and said first and second polarization converters are implemented on an electro-optical substrate selected from the group consisting of III–V compound semiconductors, $LiNbO_3$ and $LiTaO_3$ using planar light-wave circuit technology.

16. A wavelength-selective optical switch matrix for connecting i optical inputs to i monitoring outputs and to j optical outputs, comprising
   a. a plurality of i×j wavelength-selective 2×2 optical switches arranged in i rows and j columns, each said switch identifiable by a respective i-j marking, each said switch having two input and two output ports and configured to receive and provide light of different wavelengths, wherein each said switch includes
      i. a polarization splitter having a first and a second input branch and a first and second output branch,
      ii. a first wavelength-selective polarization converter connected between one said input branch of said polarization splitter and its respective input port, and
      iii. a second wavelength-selective polarization converter functionally identical with said first polarization converter and same-side connected between said output branch of said polarization splitter and said respective output port; and b. a mechanism for, activating each said i-j switch thereby obtaining an activated state that facilitates a switch matrix function selected from the group consisting of simple input i to output j wavelength selective switching, multicasting and combining.

17. The wavelength-selective optical switch matrix of claim 16, wherein said first and second wavelength-selective polarization converters include electro-optical polarization converters.

18. The wavelength-selective optical switch matrix of claim 17, further comprising an additional column of i normally ON wavelength-selective switches each said set switch connected to a respective switch in the first of said j columns, whereby said set of normally ON switches is connected to a single optical input having many channels, and whereby the addition of said set of normally ON switches imparts a wavelength de-multiplexing functionality to said optical switch matrix.

19. The wavelength-selective optical switch matrix of claim 17, further comprising an additional column of i normally ON wavelength-selective column switches, each said column switch connected to a respective switch in the last of said j columns, whereby said additional column of normally ON switches combines the i monitoring outputs into a single combined monitoring output, and whereby said combined monitoring output can be directed toward an optical performance monitoring system.

20. The wavelength-selective optical switch matrix of claim 18, further comprising an additional column of i normally ON wavelength-selective set switches, each said set switch connected to a respective switch in the first of said j columns, whereby said set of normally ON switches is connected to a single optical input having many channels, and whereby the addition of said set of normally ON switches imparts a wavelength de-multiplexing functionality to said optical switch matrix.

21. The wavelength-selective optical switch matrix of claim 7, wherein said polarization splitter and said first and second polarization converters are implemented on an electro-optical substrate selected from the group consisting of III–V compound semiconductors, $LiNbO_3$ and $LiTaO_3$ using planar light-wave circuit technology.

* * * * *